June 4, 1940.  R. W. JOHNSON  2,203,153
THERMORESPONSIVE METERING VALVE
Filed April 1, 1936    2 Sheets-Sheet 1
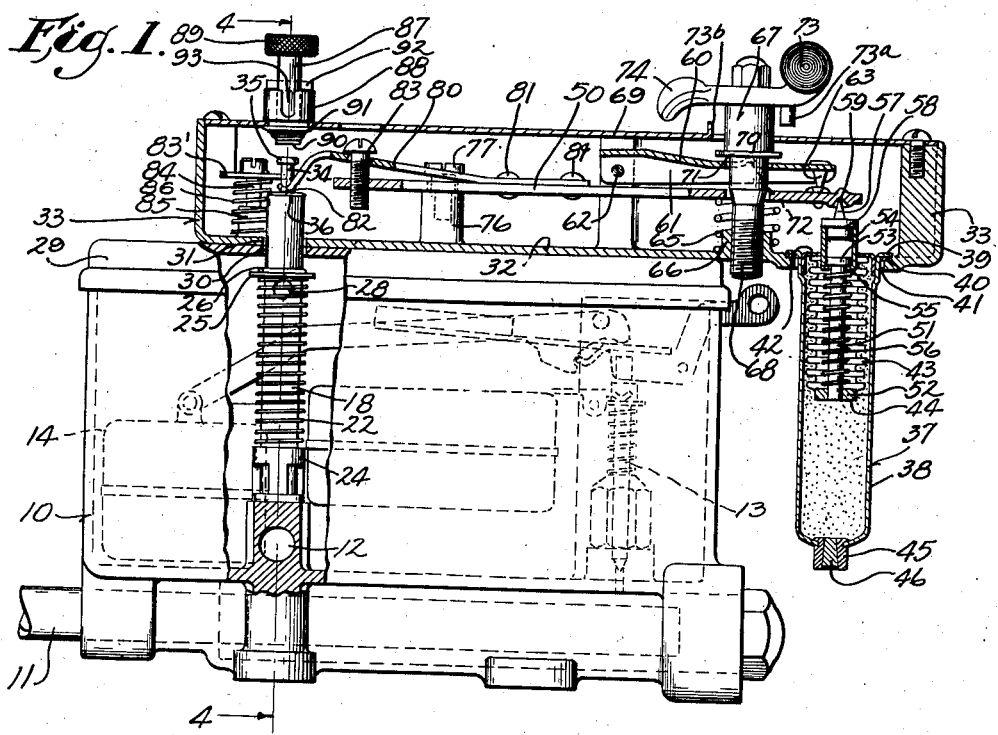
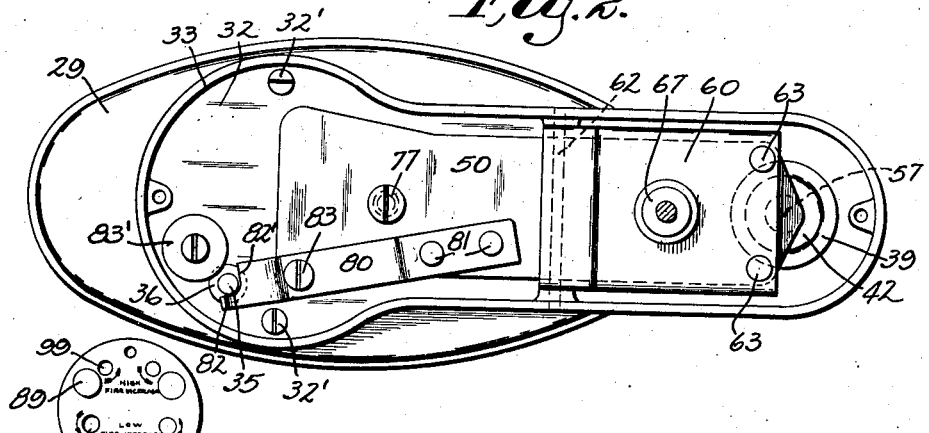
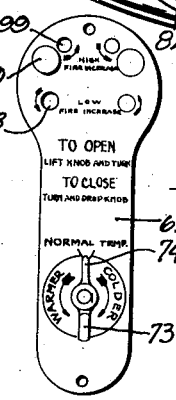
INVENTOR
Roy W. Johnson
BY John W. Michael
ATTORNEYS

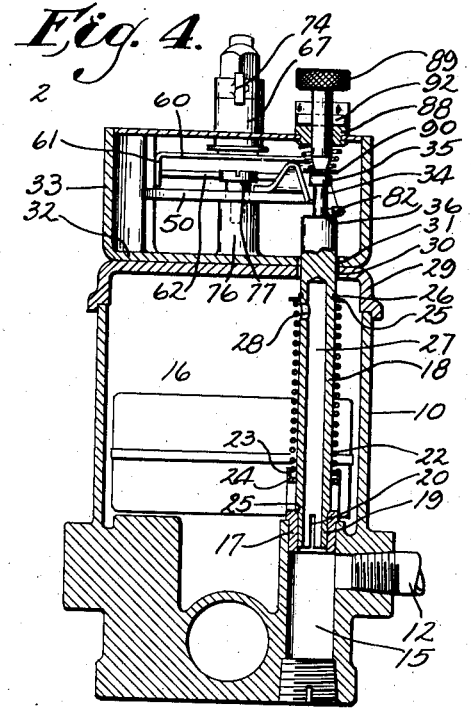
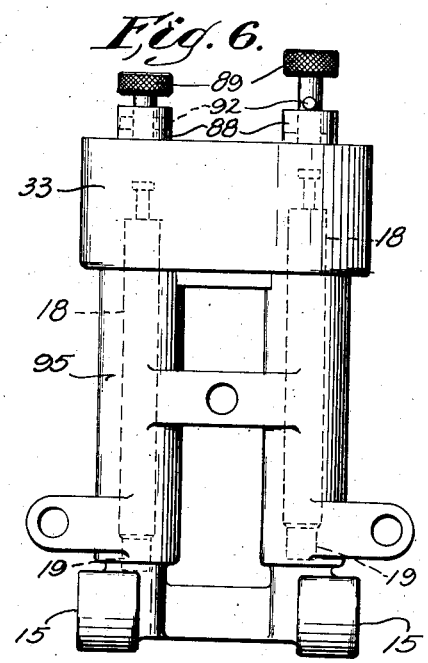
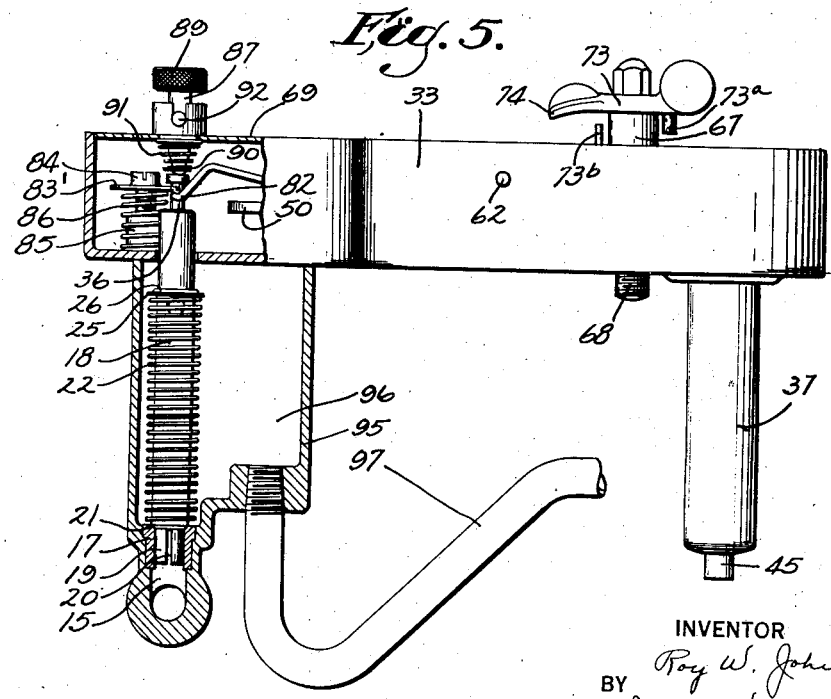

Patented June 4, 1940

2,203,153

UNITED STATES PATENT OFFICE 2,203,153

THERMORESPONSIVE METERING VALVE

Roy W. Johnson, Milwaukee, Wis.

Application April 1, 1936, Serial No. 72,049

8 Claims. (Cl. 236—99)

This invention relates to a metering valve thermostatically operated and especially designed and adapted for use in controlling the flow of fuel such as oil to oil burners.

One of the principal objects of the invention is to provide a simple and compact structural organization whereby the thermo-power-element is so effectively interconnected with the valve as to regulate the flow of oil and maintain either a high or low modulating type flame at the burner and this in a construction which is readily accessible for adjustment, replacement or repair and one whose range of action may be readily varied.

Another object of the invention is to provide a thermo-responsive valve of this character which is especially designed and adapted for use with space heaters.

Another object of the invention is to provide a device of this character and having these advantages and which may be conveniently and economically produced and installed.

Other objects and advantages reside in certain novel features of the construction, arrangement and combination of parts which will be hereinafter more fully described and particularly pointed out in the appended claims, reference being had to the accompanying drawings, forming a part of this specification, and in which:

Figure 1 is a view partly in side elevation and partly in longitudinal vertical section showing an oil control valve embodying the present invention;

Figure 2 is a view in top plan of the valve shown in Figure 1 with the cover plate for the upper housing or casing removed;

Figure 3 is a top plan view of the cover of the upper casing;

Figure 4 is a view in transverse vertical section taken on line 4—4 of Figure 1 and looking in the direction of the arrows;

Figure 5 is a view partly in side elevation and partly in longitudinal vertical section illustrating another embodiment of the invention; and Figure 6 is a view in end elevation, the view being of the left hand end of Figure 5.

Referring to the drawings, and more particularly to Figures 1 to 4, inclusive, it will be seen that in the embodiment of the invention there illustrated, a casing 10 is provided. Fuel is supplied to the casing 10 from the fuel supply pipe 11 and is taken off to the burners by means of an outlet pipe 12 (see Figure 4). Within the main casing 10 there is a float controlled inlet valve 13 equipped with an automatic safety cut-off 14. This structure will not be described in detail as it per se forms no part of the present invention and is fully disclosed and claimed in my application filed March 3, 1933, Serial No. 659,448, now Patent 2,120,364 of June 14, 1938, for Devices for controlling the flow of fuel to oil burners and the like.

An outlet passage 15 leads from the main supply chamber 16 of the casing 10 and is in direct communication with the outlet pipe 12. A shouldered sleeve 17 is fitted in the upper end of the outlet passage 15 and held in position by friction or otherwise. This sleeve 17 provides a valve seat for a tubular metering valve 18. The lower end of the metering valve 18 is reduced as at 19, and the reduced portion having a suitable number of metering slots 20 therein. At the juncture of the reduced portion 19 and the main portion of the valve 18 a beveled shoulder 21 is provided and when the valve is fully closed seats snugly against a correspondingly formed surface at the upper end of the valve seat 17.

The valve 18 is urged to open position by means of a coil spring 22. The lower end of the spring 22 is confined in the flanged upper end 23 of a tubular and slotted cylindrical supporting piece 24 which abuts directly against the upper end of the valve seat 17 and slidably embraces the body of the valve. At its upper end the spring 22 bears against a washer or suitable abutment 25 which may be held against upward movement by a spring ring 26 snapped into a groove in the periphery of the valve.

In order that the outlet valve may be vented it is provided with an axial passage 27 extending down through its lower end and communicating at its upper end with a port or opening 28 which communicates with the interior of the main supply chamber above the level of the liquid therein.

A cover 29 is provided for the main casing 10 and may be suitably secured in position. The upper end portion of the metering valve projects up through an opening 30 in the cover 29 and also through an opening 31 provided in the bottom wall 32 of an upper casing or housing 33. The upper end of the metering valve is provided with a reduced portion 34 terminating in a head 35. The metering valve 18 at the juncture of the reduced portion 34 therewith presents a horizontal shoulder 36.

Except when the metering valve is entirely shut off the present invention proposes to control its position by means of a thermo-responsive device or thermo-power-element designated generally at 37. As shown in Figures 1 and 2, the casing 33 is rather narrow and elongated and has one end overhanging or projecting beyond the adjacent end of the main casing 10. A suitable number of screws 32' secure the casing 33 and cover 29 in position. The thermo-power-element 37 depends or extends downwardly from this overhanging portion of the casing 33. The thermo-power-element 37 comprises a metal cylinder 38 which contains a suitable liquid having the property of expanding and contracting under the influence of temperature changes. The upper end of the cylinder 37 is outwardly flanged as at 39 to enable it to be supported on a heat insulating gasket 40 which surrounds the margin of an opening 41 in the overhanging portion of the bottom wall 32 of the casing. Within the upper flanged end a metal ring 42 of annular cross section is provided and has its peripheral portion snugly fitted in and secured and sealed to the upper portion of the inner wall of the cylinder 38. The horizontal flange of this ring 42 is securely fastened and sealed to the upper open end of a bellows 43. The lower end of the bellows is closed by an integral wall 44. The liquid in the cylinder 38 is inserted therein through a fitting 45 which is afterwards plugged and sealed as at 46.

The cubical expansion and contraction of the liquid in the cylinder 38 is utilized to rock a lever 50 which in turn controls the position of the metering valve 18.

In carrying out this purpose, a connection is provided between one end of the lever and the lower end of the bellows 43 and is of such a character as to preclude the application of excessive strains on the elements of the device. For this purpose a rod 51 is provided and has a head 52 at its lower end which flatly abuts against the closed inner end 44 of the bellows. The upper end of the rod 51 is also provided with a head 53 which is slidably fitted in a short cylinder 54, the lower end of which is flanged as at 55 to prevent the cylinder from sliding off of the head 53 and to provide an abutment for the upper end of a coil spring 56 which encircles the rod 51 and has its lower end abutting the head 52. The spring 56 ordinarily maintains the parts in the position shown in Figure 1 and is heavy enough to transmit operating force from the liquid in the cylinder 38 to the lever 50. If, however, the thermo-responsive element 37 is subjected to excessively high temperatures encountered, for example, when the heater or controls are stored in very warm store houses, the spring 56 will yield and prevent the transmission of excessive strains to any of the various parts. When the spring yields the head 53 slides up in the cylinder 54. A pointed projection 57 has its flanged lower end 58 fitted and secured in the upper end of the cylinder. The point of the projection engages in a recess or seat 59 provided therefor in the underside of the operating lever 50.

An adjustable fulcrum 60 may be in the form of a metal plate having side flanges 61 to strengthen it and to provide for the convenient mounting of the fulcrum on a transverse pivot pin 62 which extends through openings in the side flanges and is supported in the vertical side walls of the upper casing 33. At the end of the fulcrum 60 opposite its pivotal mounting it is provided with a pair of downwardly extending pointed projections of fulcrum points 63 which engage in recesses or seats provided therefor on the upper side of the lever 50. The projections 63 engage the lever at points offset longitudinally and transversely from that at which the projection 57 engages it. The lever 50 is urged to swing in a clockwise direction as viewed in Figure 1 by means of a coil spring 65 which has its lower end abutting the bottom 32 of the upper casing and surrounding a boss 66 extending upwardly therefrom. The upper end of the spring 65 bears against the underside of the lever 50 on the opposite side of the fulcrum point 63 from that on which the pointed projection 58 engages the lever.

The position of the adjustable fulcrum 60 is controlled by means of an adjustable bolt 67 having its lower portion threaded as at 68 and engaged with internal threads on the boss 66. This bolt 67 extends through openings in the cover 69 of the upper casing in the adjustable fulcrum 60 and in the lever 50. Above the fulcrum 60 the bolt 67 is shouldered as at 70. A washer 71 may be positioned against this shoulder and engages raised portions 72 provided on the opposite sides of the opening in the adjustable fulcrum. As the bolt 67 is turned in one direction or the other the shoulder 70 and its washer 71 moves up and down and this either allows the fulcrum 60 to move upwardly under the action of the spring 65 or causes the fulcrum 60 to move downwardly against the action of this spring 65. A handle or operating element 73 is suitably secured to the bolt 67 to facilitate turning thereof. One end of the handle may be formed to provide an indicator finger 74 which coacts with indicia "warmer," "colder," and arrows to designate the effect of the adjustment of the handle 73 and its bolt 67. Stop pins 73ª and 73ᵇ limit the turning of the handle 73.

A resilient and elongated finger designated at 80 is provided and has one end portion riveted to the lever 50 as at 81 and its other end portion projecting beyond the lever and terminating in a downwardly offset curved end 82. This finger 80 is made of stiffly resilient metal and is shaped and formed to tend to spring up away from the lever 50 under the influence of its inherent resiliency. It may, however, be forced downwardly toward and, if desired, against the lever 50 under the influence of an adjusting screw 83 having its shank extending through an opening in the finger 80 and interthreaded with the lever 50, the head of the screw engaging the margin of the opening in the finger 80. The depressed curved end 82 of the finger is notched out as at 82' (see Figure 2) and bears against a portion of the shoulder 36 of the metering valve.

The movement of the main lever 50 is limited in one direction by a boss 76 integral with or fixed to the bottom 32 of the casing 33 and is limited in the other direction by the head of a stop screw 77, the shank of which extends loosely through an opening in lever 50.

For the purpose of limiting the extent to which the metering valve may open, a stop disc 83' is provided and is fixed to a screw 84 adjustably interthreaded with a boss 85 fixed to the bottom wall 32 of the upper casing. A spring 86 is interposed between the disc 83' and the bottom wall 32 acts to releasably secure the disc 83' in any adjustment. When the metering valve moves up to full open position its shoulder 36 abuts a portion of the disc 83'.

For the purpose of entirely closing the metering valve 18 and shutting off all flow of fuel to the burner, a sliding bolt 87 is provided and is fitted for sliding and turning movement in a bearing collar 88 provided therefor on the cover 69 of the upper casing. This bolt 87 extends through the collar 88 and through an opening in the cover 69. At its upper end it is provided with a knurled knob 89. The lower end of the bolt 80 has a disc-like head 90. Interposed between the underside of the cover 69 and the head 90 is a spring 91 which tends to force the bolt 87 downwardly. A cross pin 92 is provided on the bolt 87 and has its ends projecting beyond the periphery of the bolt. When the bolt is drawn upwardly and the cross pin 92 angularly positioned to rest upon the upper end portions of the collar 88 the spring 91 is compressed and the head 90 will be spaced from the head 35 at the upper end of the metering valve when said valve is adjusted within its limited extent. If, however, the knob 89 is rotated to bring the cross pin 92 into registration with diametrically opposite vertical slots 93 in the collar 88 the spring 91 will force the bolt downwardly to cause the head 90 to engage the head 35 of the metering valve and punch the metering valve closed.

In the embodiment of the invention shown in Figures 5 and 6, the metering valve 18, thermo-power-element 37, interconnecting lever 50, its adjustable fulcrum 60, finger 80 and the various adjustments are identical with those just described and the description hereinabove applies hereto. In this embodiment of the invention the main casing construction is radically different and is designated at 95. It simply provides a supply chamber 96 to which liquid is supplied from pipe 97. This type of valve is for use on a one or two burner type circulating space heater with a nested ring or two burner type unit using a bottle or barometric feed. It is, however, also of the high and low fire type and will accurately meter oil flowing to the burner.

In both embodiments of the invention the control must be so placed that the thermo-power-element 37 is disposed in the direct intake air stream of the space heater.

In practice, the upper limit of the temperature range can be varied as desired by adjusting the handle 73 in one direction or the other, inasmuch as such adjustment varies the position of the adjustable fulcrum points 63 with consequent variation in the position of the lever 50. For any particular adjustment as the air flowing past the thermo-power-element 37 cools off the liquid therein contracts. This allows the spring 65 to swing the lever 50 in a clockwise direction as viewed in Figure 1, thereby permitting the spring 22 to open the metering valve and consequently allow more oil to flow to the burner. As the air passing through the thermo-power-element 37 heats up, the liquid therein expands with the result that the projection 58 swings the lever 50 in a counter-clockwise direction, as viewed in Figure 1, about its fulcrum points 63, thereby swinging the finger 80 downwardly and causing its end 82 to act on the shoulder 36 of the metering valve to move the metering valve downwardly against the action of the spring 22 and cut down the amount of oil supplied to the burner. The flame at the burner for low fire may be varied by adjusting the screw 83 whereas the maximum flame had at high fire is determined by adjusting the screw 84. Openings 98 and 99 in the cover 69 make practical the adjustment of these screws 83 and 84 with the cover 69 in place. When it is desired to turn off the burner it is simply necessary to rotate the knob 89 and allow the ends of the pin 92 to move down in the slots 93.

While I have shown and described several constructions in which the invention may be advantageously embodied, it is to be understood that these constructions have been selected merely for the purpose of illustration or example and that various changes in the size, shape and arrangement of the parts may be made without departing from the spirit of the invention or the scope of the subjoined claims.

The invention claimed is:

1. An oil control device of the character described comprising a casing having an outlet and provided with a valve seat adjacent said outlet, a metering valve cooperable with the valve seat to regulate flow through the outlet, means for biasing the metering valve to open position, a thermo-power-element supported adjacent to and disposed exteriorly of the casing, a lever fulcrumed within the casing and having one arm interconnected with the thermo-power-element to be actuated thereby, said lever having one of its arms extending toward the metering valve, the upper end of the metering valve having a shoulder, a stiffly resilient finger having one end rigidly secured to the arm of the lever adjacent the valve and having its other end projecting beyond the lever and engaging the shoulder of the valve, screw means cooperable with the finger and the lever to flex the finger and change its position with respect to the lever, and means for limiting the movement of the lever in the direction in which it tends to cause the finger to move the valve toward closed position, said screw means operating conjointly with said last-named means to vary the lower limit of the movement which the finger transmits from the lever to the valve thereby determining the low fire position of the valve.

2. An oil control device of the character described comprising a casing having an outlet and provided with a valve seat, a metering valve cooperable with said valve seat to regulate flow of oil through said outlet, means for biasing the metering valve away from its seat, a thermo-power-element supported adjacent to and projecting exteriorly of said casing, a lever fulcrumed intermediate its ends within the casing and having one of its lever arms actuated by said thermo-power-element, the other arm of said lever extending toward said metering valve, a finger connected to the lever and cooperable with the valve and effective positively to transmit the motion of the lever to the valve when the lever swings in a direction to close the valve, means for limiting the movement of the lever in the direction in which it tends to close the valve, and means adjusting the finger with respect of the lever to vary the extent to which the valve is moved toward its seat by the finger when the lever is at the limit of its swing in the direction in which it moves to close the valve whereby to regulate the low fire position of the metering valve.

3. An oil control device of the character described comprising a casing having an outlet and provided with a valve seat adjacent said outlet, a metering valve cooperable with the valve seat to regulate flow through the outlet, means for biasing the metering valve to open position, a thermo-power-element supported adjacent to and disposed exteriorly of the casing, a lever fulcrumed within the casing and having one arm interconnected with the thermo-power-element to be actuated thereby, said lever having one of its arms extending toward the metering valve, the upper end of the metering valve having a shoulder, a stiffly resilient finger having one end secured to the arm of the lever adjacent the valve and having its other end projecting beyond the lever and engaging a portion of the shoulder of the valve, screw means cooperable with the finger and the lever to flex the finger and change its position with respect to the lever, means for limiting the movement of the lever in the direction in which it tends to cause the finger to move the valve toward closed position, said screw means operating conjointly with said last-named means to vary the movement which the finger transmits from the lever to the valve thereby determining the low fire position of the valve, and an adjustable stop positioned in the casing and engageable with a portion of the shoulder spaced from that engaged by the finger to limit the opening movement of the valve and thereby determine the high fire position thereof.

4. An oil control device of the character described and comprising a casing having an outlet and provided with a valve seat adjacent the outlet, a metering valve cooperable with the valve seat to regulate flow through the outlet, means for urging the metering valve to open position, a thermo-power-element supported on the casing and disposed exteriorly thereof, a lever fulcrumed within the casing and having one arm interrelated with the thermo-power-element so as to be actuated thereby, said lever having one arm extending toward the valve, means for limiting the movement of the lever in a direction tending to close the valve, adjustable means for positively transmitting the motion of the lever to the valve and effective, by virtue of its adjustable character in conjunction with the action of said last named means, to control the low fire position of the valve, stop means cooperable with the valve to regulate its high fire position, and a spring biased plunger overlying the valve and having means for normally latching it in inoperative position but effective when released to provide for the punching of the valve to fully closed position under the action of its bias.

5. An oil control device of the character described comprising a casing having an outlet, a metering valve for regulating flow of oil through said outlet, a valve operating lever, a thermo-power-element for controlling the position of said lever, adjustable means for positively transmitting the motion of the lever to the valve and effective, by virtue of its adjustable character, to control the low fire position of the valve, stop means cooperable with the valve to regulate its high fire position, and a device operable from the exterior of the casing and normally releasably secured in inoperative relation to the valve but effective when released to move the valve to fully closed position.

6. An oil control device of the characer described comprising a casing having an outlet, a metering valve for regulating flow of oil through said outlet, means for biasing the metering valve to open position, a valve operating lever, a thermo-power-element for controlling the position of said lever, the upper portion of said valve having a shoulder, a motion transmission element engageable with a portion of said shoulder, means for adjustably and positively interconnecting said element with said lever whereby said element is effective positively to transmit motion from the lever to the valve in a direction tending to close the valve, means for limiting the movement of the lever in a direction to close the valve whereby the adjustment of said element with respect to said lever controls the low fire position of the valve, and an adjustable stop positioned in the casing and engageable with a portion of the shoulder spaced from that engaged by the element to limit the opening movement of the valve and thereby determine its high fire position.

7. An oil control device of the character described comprising a casing having an outlet, a metering valve for regulating flow through the outlet, means for biasing the metering valve to open position, a thermo-power-element, a single valve operating lever having one end overlying and actuated by said thermo-power-element and having its opposite end operatively connected with the metering valve, a swingable fulcrum pivotally supported in the casing above said lever and engaging the upper side of the lever intermediate the thermo-power-element and the metering valve, a spring interposed between the underside of the lever and the underlying portion of the casing at a point in between the fulcrum and the metering valve, said lever and said fulcrum having openings alined with each other and with the axis of said spring, and a stud extending through said openings and through the spring and threadedly connected with the casing and projecting exteriorly thereof, said stud having a collar engageable with the fulcrum whereby upon turning of the stud the position of the fulcrum is varied.

8. An oil control device of the character described comprising a casing having an outlet, a metering valve for regulating flow through the outlet, means for biasing the metering valve to open position, a valve operating lever having an arm engageable with the metering valve, a thermo-power-element supported on the casing and projecting exteriorly thereof and having a movable part engageable with said lever, a swingable fulcrum pivotally supported in the casing and engaging the lever intermediate the movable part of the thermo-power-element and the valve, said fulcrum and said lever having openings, a single adjusting stud extending through said openings, threadedly interconnected with the casing and projecting exteriorly thereof whereby it may be turned from the exterior, a collar on said stud engageable with the fulcrum for shifting the position thereof as the control member is turned, and a spring interposed between the housing and the lever and opposing the action of the thermo-power-element and also maintaining the lever in engagement with the movable part of the thermo-power-element and the swingable fulcrum.

ROY W. JOHNSON.